United States Patent
Ohshima et al.

[11] Patent Number: 5,459,625
[45] Date of Patent: Oct. 17, 1995

[54] ROTARY HEAD DRUM DEVICE

[75] Inventors: Eiji Ohshima, Kanagawa; Yoshihito Takamizawa, Tokyo, both of Japan

[73] Assignee: Sony Corporation, Tokyo, Japan

[21] Appl. No.: 396,869

[22] Filed: Mar. 1, 1995

Related U.S. Application Data

[63] Continuation of Ser. No. 51,539, Apr. 26, 1993, abandoned.

[30] Foreign Application Priority Data

May 19, 1992 [JP] Japan .................................. 4-150113

[51] Int. Cl.$^6$ ........................... G11B 15/60; G11B 5/52
[52] U.S. Cl. .................. 360/84; 360/107; 360/130.24
[58] Field of Search ................. 360/84, 85, 104–106, 360/107–109, 130.22–130.24

[56] References Cited

U.S. PATENT DOCUMENTS

| | | | |
|---|---|---|---|
| 4,366,516 | 12/1982 | Ogata et al. | 360/130.24 |
| 4,408,239 | 10/1983 | Ushiro | 360/84 |
| 4,611,255 | 9/1986 | Ushiro et al. | 360/84 |
| 4,706,143 | 11/1987 | Asada et al. | 360/84 |
| 4,740,848 | 4/1988 | Schild et al. | 360/84 |
| 4,811,134 | 3/1989 | Takano | 360/85 |
| 4,959,742 | 9/1990 | Tsutsumi | 360/84 |
| 4,972,283 | 11/1990 | Kim | 360/130.24 |
| 5,089,921 | 2/1992 | Kodama et al. | 360/85 |

FOREIGN PATENT DOCUMENTS

| | | | |
|---|---|---|---|
| 59-65967 | 4/1984 | Japan | 360/84 |
| 61-94215 | 5/1986 | Japan | 360/84 |
| 62-102461 | 5/1987 | Japan | 360/130.24 |
| 62-154253 | 7/1987 | Japan | 360/84 |

Primary Examiner—Stuart S. Levy
Assistant Examiner—Jefferson Evans
Attorney, Agent, or Firm—Jay H. Maioli

[57] ABSTRACT

In a rotary head drum device for use in a video tape recorder or the like, a motor is provided between a rotating drum and a fixed drum. A drum base has at least three supporting surfaces for supporting the head drum. The supporting surfaces are formed at positions substantially equally spaced from a center of a rotating shaft fixed to the rotating drum and substantially equally spaced from each other. A single screw for fixing the fixed drum to the drum base is threaded into the fixed drum in the vicinity of the rotating shaft. With this construction, quality can be improved, and cost can be reduced.

12 Claims, 3 Drawing Sheets

ROTARY HEAD DRUM DEVICE

This is a continuation of application Ser. No. 08/051,539 filed Apr. 26, 1993, now abandoned.

BACKGROUND OF THE INVENTION

1. Field of the Invention

The present invention relates to a rotary head drum device for use in a video tape recorder (VTR) or the like.

2. Description of the Related Art

FIG. 5 is a schematic side view of a rotary head drum device in the related art.

Referring to FIG. 5, reference numeral 51 generally denotes the rotary head drum device. The rotary head drum device 51 is generally constructed of a drum base 52 and a head drum 53 provided on the drum base 52. The drum base 52 is adapted to be fixedly mounted on a chassis of a video tape recorder (not shown).

The head drum 53 is generally constructed of a rotating drum 54, a fixed drum 55 provided under the rotating drum 54, and a motor 56 provided under the fixed drum 55. A rotating shaft (not shown) is rotatably supported at a lower portion thereof by the fixed drum 55. The rotating drum 54 is fixed to the rotating shaft at an upper portion thereof, so that the former is rotatable together with the latter.

A tape lead 57 is formed as a stepped portion on the outer circumferential surface of the fixed drum 55 to define a passage along which a magnetic tape 64 travels. That is, the magnetic tape 64 is wound around the outer circumferential surfaces of the rotating drum 54 and the fixed drum 55 as being guided by the tape lead 57. In this condition, the magnetic tape 64 is driven by a driving means (not shown) to run along the tape lead 57.

A plurality of magnetic heads 58 are fixedly mounted on the lower surface of the rotating drum 54 opposed to the upper surface of the fixed drum 55. A plurality of windows 59 are formed on the outer circumferential surface of the rotating drum 54 so as to correspond to the magnetic heads 58. The tips of the magnetic heads 58 slightly project from the respective windows 59 to the outside of the rotating drum 54 in the radial direction thereof. A rotor (not shown) of the motor 56 is fixedly mounted through the rotating shaft to the rotating drum 54, and a stator (not shown) of the motor 56 is fixedly mounted to the lower surface of the fixed drum 55 at a radially outside portion thereof by means of screws 65.

The head drum 53 is fixed through a plurality of metal mounting sheets 60 to the drum base 52 by using screws 61 and 63. A plurality of mounting portions 62 for mounting the metal mounting sheets 60 are formed on the upper surface of the drum base 52 at three positions substantially equally spaced from a center of the rotating shaft and substantially equally spaced from each other in the circumferential direction. Each metal mounting sheet 60 is fixed at one end thereof to the lower surface of the motor 56 by means of each screw 61. Each mounting portion 62 is formed with a tapped hole (not shown) for threadedly engaging each screw 63. The metal mounting sheets 60 fixed to the motor 56 are mounted on the respective mounting portions 62, and the screws 63 are tightened thereto to fix the metal mounting sheets 60. Accordingly, if the dimensional accuracy of each mounting portion 62 is not good or the degree of tightening of each screw 63 is not uniform, the dimensional accuracy of the tape lead 57 required for high working accuracy, such as several μm, cannot be satisfied.

In a recording or reproducing operation of the rotary head drum device 51, the rotating drum 54 is rotated at a high speed in a direction depicted by an arrow A in FIG. 5, and the magnetic tape 64 travels in a direction depicted by an arrow B in FIG. 5. Further, when the rotating drum 54 is rotated, the tips of the magnetic heads 58 mounted on the rotating drum 54 are sequentially brought into sliding contact with the magnetic tape 64 traveling in the wound condition around the outer circumferential surfaces of the rotating drum 54 and the fixed drum 55, thereby effecting recording or reproduction.

In the rotary head drum device 51, the metal mounting sheets 60 fixed to the motor 56 are first mounted on the respective mounting portions 62 of the drum base 52, and the screws 63 are then tightened to the mounting portions 62 to fix the metal mounting sheets 60. Thus, the head drum 53 is fixed through the metal mounting sheets 60 to the drum base 52. The use of the metal mounting sheets 60 is due to the following reasons: if the metal mounting sheets 60 are not used, the fixed drum 55 would be fixed at its outer circumferential portion to the drum base 52 by means of screws. However, in this case, the fixing of the fixed drum 55 is hindered by the motor 56 because the motor 56 is provided under the fixed drum 55. Further, if the screws for fixing the fixed drum 55 to the drum base 52 are strongly tightened, a strain due to a low rigidity of the fixed drum 55 would be generated to have an adverse effect on the accuracy of the tape lead 57 requiring a high accuracy such as several μm. Accordingly, much time would be required to remove the above adverse effect by adjusting a degree of tightening of each screw. However, since the above structure employs the many screws 61, 63 and 65, a material cost and an assembling cost are increased.

SUMMARY OF THE INVENTION

It is accordingly an object of the present invention to provide a rotary head drum device which can improve quality and reduce cost.

According to the present invention, there is provided in a rotary head drum device including a drum base; a head drum having an outer circumferential surface around which a magnetic tape is wound to run, said head drum being composed of a fixed drum and a rotating drum; a screw for fixing said head drum to said drum base; a magnetic head fixedly mounted on said rotating drum; and a motor for rotating said rotating drum to bring a tip of said magnetic head into sliding contact with said magnetic tape during running and effect recording or reproduction; the improvement wherein said motor is provided between said rotating drum and said fixed drum; said drum base has at least three supporting surfaces for supporting said head drum, said at least three supporting surfaces being formed at positions substantially equally spaced from a central shaft of said head drum and substantially equally spaced from each other; and said screw comprises a single screw threaded into said head drum in the vicinity of said central shaft.

With this construction, the motor is provided between the rotating drum and the fixed drum. That is, unlike the related art mentioned above, the motor is not provided between the drum base and the fixed drum. Accordingly, the fixing of the fixed drum to the drum base is not hindered by the motor, but the screw can be easily tightened at a balanced position substantially centered among the at least three supporting surfaces. Therefore, the fixed drum and the drum base can be firmly fixed together even by the single screw, so that an assembling cost and a material cost can be reduced.

Further, the fixed drum is fixed at its central portion by the single screw. That is, the fixed portion of the fixed drum is formed at a position spaced apart from the tape lead formed on the outer circumferential surface of the fixed drum, so that it is possible to prevent that the strain due to the fixing of the fixed drum will affect the tape lead, thus improving the quality.

Other objects and features of the invention will be more fully understood from the following detailed description and appended claims when taken with the accompanying drawings.

DETAILED DESCRIPTION OF THE PREFERRED EMBODIMENTS

Figure 1:
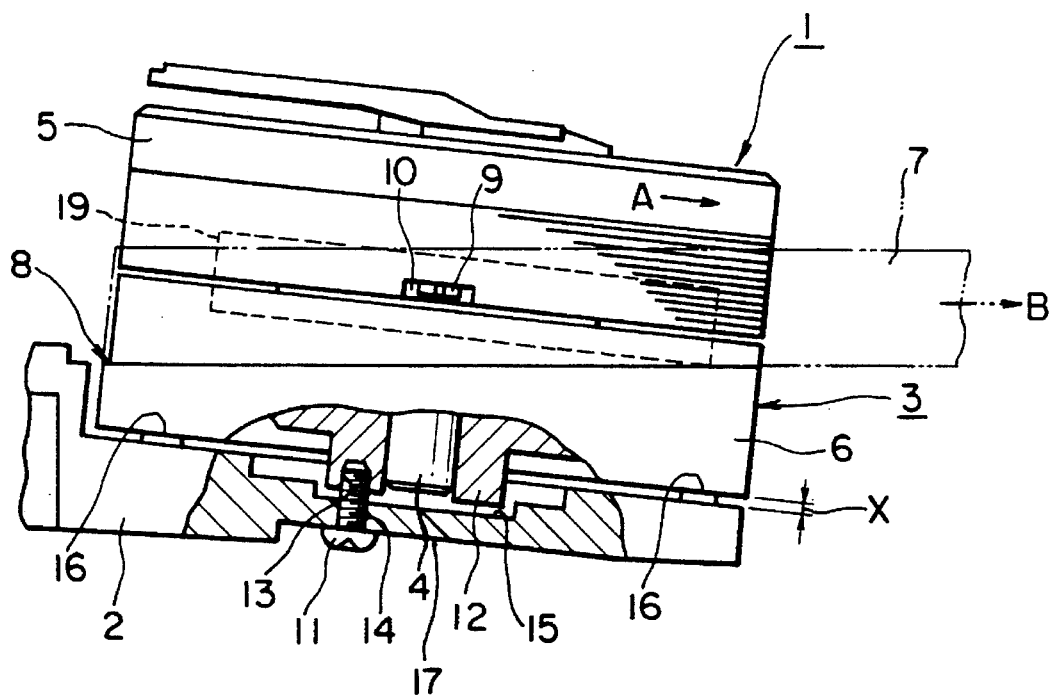
FIG. 1 is a schematic side view, partially in section, of a rotary head drum device according to a preferred embodiment of the present invention.

Referring now to FIG. 1, reference numeral 1 generally denotes a rotary head drum device according to a preferred embodiment of the present invention. The drum device 1 is generally constructed of a drum base 2 and a head drum 3 provided on the drum base 2. The drum base 2 is adapted to be fixedly mounted on a chassis of a video tape recorder (not shown).

The head drum 3 is generally constructed of a rotating drum 5 and a fixed drum 6 provided under the rotating drum 5. A rotating shaft 4 is rotatably supported at a lower portion thereof by the fixed drum 6. The rotating drum 5 is fixed to the rotating shaft 4 at an upper portion thereof, so that the former is rotatable together with the latter. A motor 19 is provided between the rotating drum 5 and the fixed drum 6. A rotor (not shown) of the motor 19 is fixedly mounted through the rotating shaft 4 to the rotating drum 5, and a stator (not shown) of the motor 19 is fixedly mounted to the fixed drum 6. Accordingly, when the motor 19 is driven, the rotor, the rotating drum 5 and the rotating shaft 4 are rotated together.

A tape lead 8 is formed as a stepped portion on the outer circumferential surface of the fixed drum 6 to define a passage along which a magnetic tape 7 travels. That is, the magnetic tape 7 is wound around the outer circumferential surfaces of the rotating drum 5 and the fixed drum 6 as being guided by the tape lead 8. In this condition, the magnetic tape 7 is driven by a driving means (not shown) to run along the tape lead 8.

A plurality of magnetic heads 9 are fixedly mounted on the lower surface of the rotating drum 5 opposed to the upper surface of the fixed drum 6. A plurality of windows 10 are formed on the outer circumferential surface of the rotating drum 5 so as to correspond to the magnetic heads 9. The tips of the magnetic heads 9 slightly project from the respective windows 10 to the outside of the rotating drum 5 in the radial direction thereof.

The head drum 3 is fixed to the drum base 2 by using a single screw 11.

More specifically, the fixed drum 6 is integrally formed at its central portion with a bearing portion 12 for rotatably supporting the rotating shaft 4. The bearing portion 12 has a lower surface formed with a tapped hole 13 for threadedly engaging the screw 11.

Figure 2:
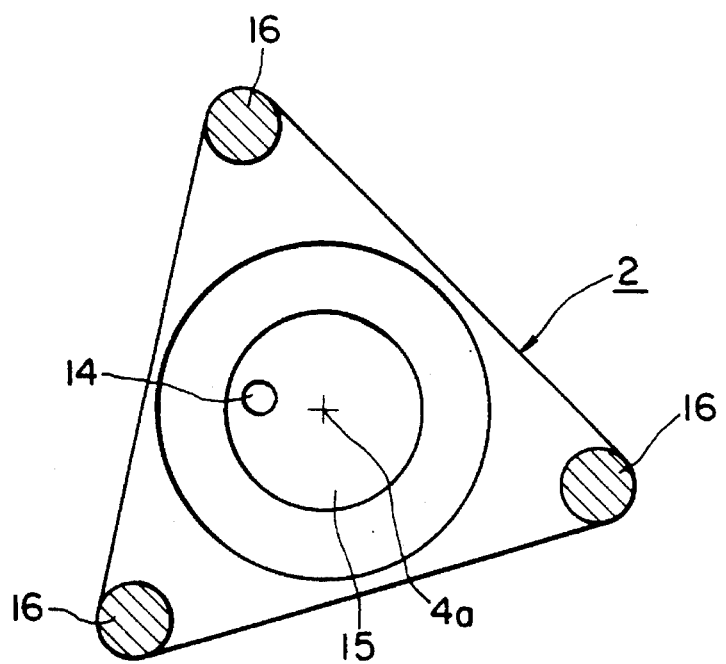
FIG. 2 is a schematic plan view of an essential part of a drum base shown in FIG. 1.

On the other hand, the drum base 2 is formed with a through-hole 14 aligned with the tapped hole 13 so that the screw 11 may be inserted through the through-hole 14. Further, the drum base 2 is formed with a recess 15 for receiving a lower end portion of the bearing portion 12. As best shown in FIG. 2, three supporting surfaces 16 for supporting the lower surface of the fixed drum 6 are formed on the upper surface of the drum base 2 at three positions substantially equally spaced from a center 4a of the rotating shaft 4 and substantially equally spaced from each other in the circumferential direction. The three supporting surfaces 16 are formed at the tops of projections formed on the upper surface of the drum base 2.

In mounting the head drum 3 onto the drum base 2, the tapped hole 13 of the bearing portion 12 of the fixed drum 6 is aligned with the through-hole 14 of the drum base 2, and the lower surface of the fixed drum 6 is placed on the three supporting surfaces 16 of the drum base 2. In this condition, as shown in FIG. 1, there is defined a gap X between the drum base 2 and the head drum 3 by the projections forming the supporting surfaces 16 on the upper surface of the drum base 2.

Then, the screw 11 is inserted into the through-hole 14 of the drum base 2 from the lower side thereof, and is threaded into the tapped hole 13 of the bearing 12 attached to the fixed drum 6. As shown in FIG. 1, a portion of the drum base 2 around the through-hole 14, that is, corresponding to the recess 15 is formed as an elastically deformable thin-walled portion 17. Accordingly, when the screw 11 is strongly tightened, the thin-walled portion 17 is elastically deformed. As a result, an elastic reaction force of the thin-walled portion 17 makes the supporting surfaces 16 strongly abut against the lower surface of the fixed drum 6. Thus, the head drum 3 is fixedly mounted on the drum base 2 to construct the rotary head drum device 1.

In a recording or reproducing operation of the rotary head drum device 1, the rotating drum 5 is rotated at a high speed in a direction depicted by an arrow A in FIG. 1, and the magnetic tape 7 travels in a direction depicted by an arrow B in FIG. 1. Further, when the rotating drum 5 is rotated, the tips of the magnetic heads 9 mounted on the rotating drum 5 are sequentially brought into sliding contact with the magnetic tape 7 traveling in the wound condition around the outer circumferential surfaces of the rotating drum 5 and the fixed drum 6, thereby effecting recording or reproduction.

According to the rotary head drum device 1 mentioned above, the motor 19 is provided between the rotating drum 5 and the fixed drum 6. That is, unlike the related art mentioned above, the motor 19 is not provided between the drum base 2 and the fixed drum 6. Accordingly, the fixing of the fixed drum 6 to the drum base 2 is not hindered by the motor 19, but the screw 11 can be easily tightened at a balanced position substantially centered among the three supporting surfaces 16. Therefore, the fixed drum 6 and the drum base 2 can be firmly fixed together even by the single screw 11, so that an assembling cost and a material cost can be reduced.

Furthermore, the fixed drum 6 is fixed at its central portion by the single screw 11. That is, the fixed portion of the fixed drum 6 is formed at a position spaced apart from the tape lead 8 formed on the outer circumferential surface of the fixed drum 6, so that it is possible to prevent that the strain due to the fixing of the fixed drum 6 will affect the tape lead 8.

Figure 3:
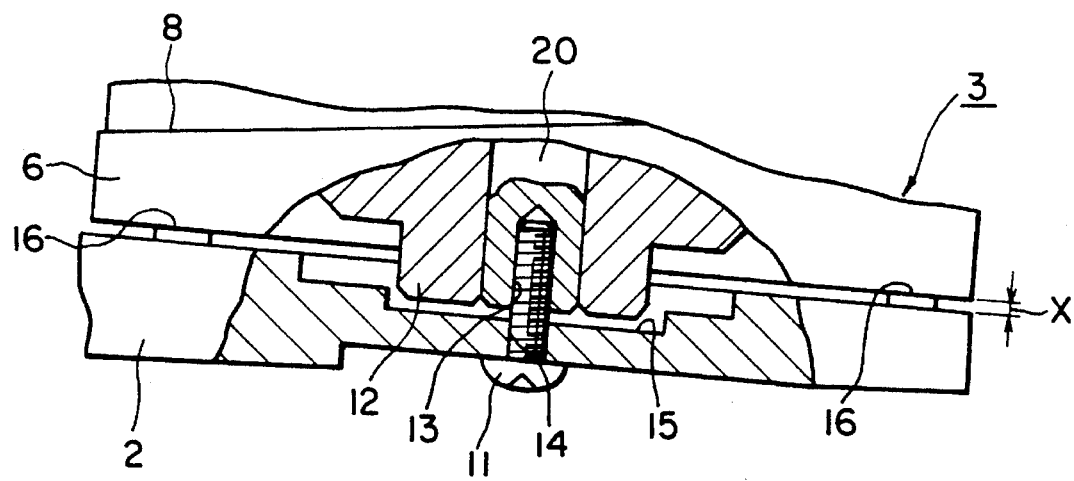
FIG. 3 is a schematic side view, partially in section, of an essential part of a rotary head drum device according to another preferred embodiment of the present invention.

While the tapped hole 13 is formed in the bearing portion 12 of the fixed drum 6, and the bearing portion 12 is fixed to the drum base 2 by the screw 11 in the above preferred embodiment, such a fixing structure of the fixed drum 6 to the drum base 2 may be modified as shown in FIG. 3, wherein the same reference numerals as those shown in FIG. 1 denote the same parts. Referring to FIG. 3, a bearing shaft 20 for rotatably supporting the rotating drum 5 is fixed to the fixed drum 6 at an exactly central portion thereof. The bearing shaft 20 is formed at its lower end portion with a tapped hole 13 threadedly engaging a screw 11. According to this structure, the exactly central portion of the fixed drum 6 can be fixed by the screw 11.

Figure 4:
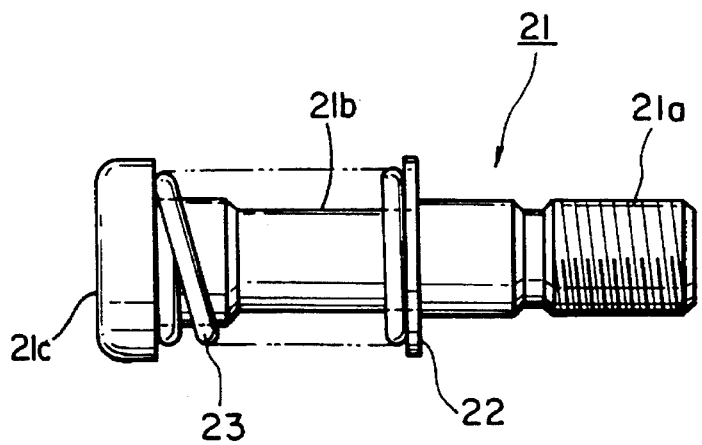
FIG. 4 is a side view of a screw employed in a rotary head drum device according to still another preferred embodiment of the present invention.
Figure 5:
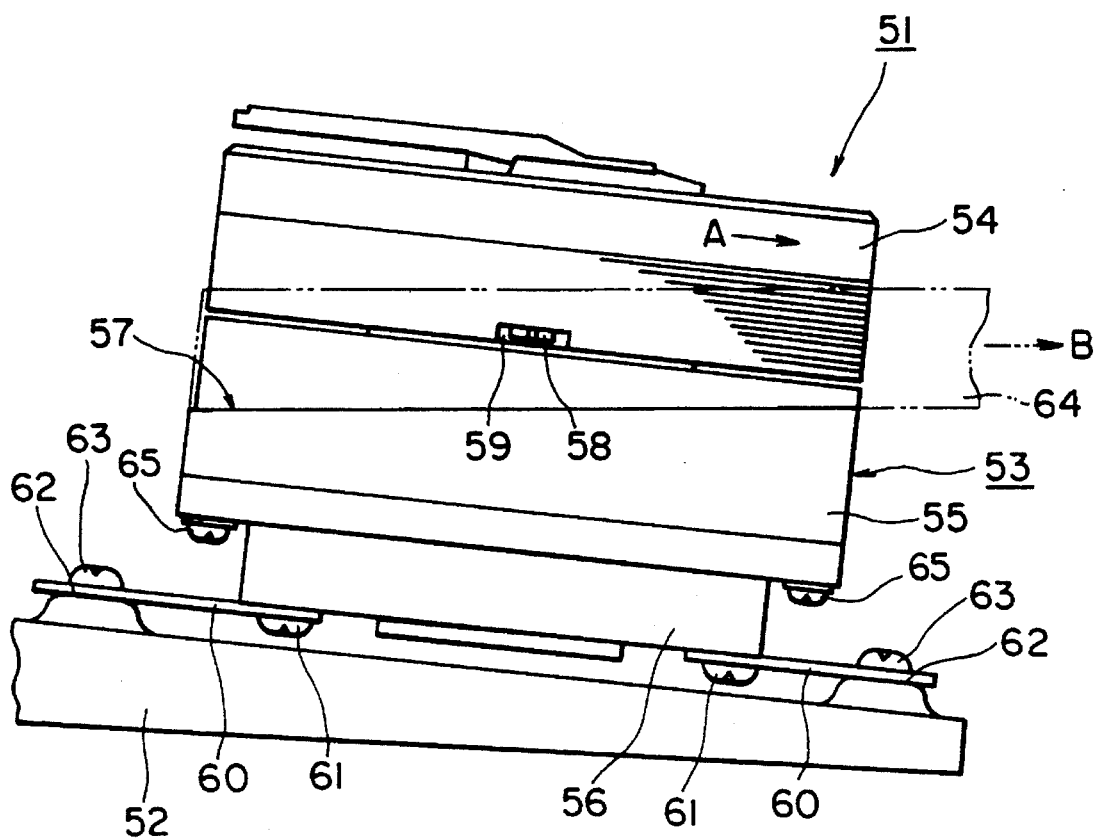
FIG. 5 is a schematic side view of a rotary head drum device in the related art.

Further, the means for providing the elastic reaction force between the drum base 2 and the fixed drum 6 may be modified as shown in FIG. 4. Referring to FIG. 4, reference numeral 21 generally denotes a spring screw. The spring screw 21 is formed at its tip portion with a threaded portion 21a. A collar 22 and a spring 23 are loosely mounted on a shaft portion 21b of the spring screw 21, and the spring 23 is interposed between the collar 22 and a head portion 21c of the spring screw 21. Accordingly, when the threaded portion 21a is threaded into the tapped hole 13, the collar 22 is elastically urged against the lower surface of the drum base 2 by a reaction force of the spring 23 compressed between the collar 22 and the head portion 21c of the spring screw 21.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A rotary head drum device for a tape recording apparatus, comprising:

a head drum having an outer circumferential surface around which a magnetic tape is wound to run, said head drum being composed of a fixed drum, a rotating drum and a central shaft rotatably mounted in a bearing portion fixedly mounted to said fixed drum;

a magnetic head fixedly mounted on said rotating drum;

a motor arranged between said fixed drum and said rotating drum for rotating said rotating drum to bring said magnetic head into sliding contact with said magnetic tape during running to effect recording or reproduction;

a drum base fixedly mounted to the tape recording apparatus and having three raised supporting surfaces in contact with a lower surface of said fixed drum for supporting said head drum, said three raised supporting surfaces being formed at positions substantially equally spaced from the central shaft of said head drum and substantially equally spaced from each other; and attachment means for attaching said head drum to said drum base and formed of a single screw passing through an aperture in said drum base in the vicinity of said central shaft and threaded into said bearing portion fixedly mounted to said fixed drum.

2. The rotary head drum device as defined in claim 1 wherein said fixed drum has an outer circumferential surface formed with a stepped portion for defining a passage along which said magnetic tape is guided to run.

3. The rotary head drum device as defined in claim 1 wherein said single screw is formed with a head portion, further comprising elastic means interposed between said head portion and said drum base.

4. The rotary head drum device according to claim 1, wherein said drum base has a recessed portion formed therein for receiving a lower end portion of said bearing portion.

5. The rotary head drum device according to claim 4, wherein said aperture is located in said recessed portion of said drum base.

6. The rotary head drum device according to claim 5, wherein said recessed portion in said drum base forms an elastically deformable, thin-walled portion in said drum base whereat said single screw passes through said aperture.

7. The rotary head drum device according to claim 1, wherein said three raised supporting surfaces have a respectively equal height, whereby upon contacting said fixed drum said lower surface of said fixed drum is separated from said drum base by a gap.

8. A rotary head drum device for a tape recording apparatus, comprising:

a head drum assembly having a fixed drum, a central shaft and a rotating drum with a magnetic head mounted on said rotating drum, said head drum assembly further having a bearing portion affixed to said rotating drum;

a head drum motor arranged in said head drum assembly between said rotating drum and said fixed drum, a rotating portion of said head drum motor being affixed to said rotating drum and a stationary portion of said head drum motor being affixed to said central shaft;

a drum base affixed to said apparatus for mounting said head drum assembly and having three raised supporting surfaces in contact with a lower surface of said fixed drum for supporting said head drum assembly, said three raised supporting surfaces being substantially equally spaced from said central shaft of said head drum assembly and substantially equally spaced from each other; and attachment means for attaching said head drum assembly to said drum base and formed of a single screw passing through an aperture in said drum base and being threaded into a tapped hole in said central shaft of said head drum assembly, whereby said central shaft is fixed to said drum base and said rotating drum and bearing portion rotate about said central shaft fixed to said drum base.

9. The rotary head drum device according to claim 8, wherein said three raised supporting surfaces have a respectively equal height, whereby upon contacting said fixed drum said lower surface of said fixed drum is separated from said drum base by a gap.

10. The rotary head drum device according to claim 8, wherein said drum base has a recessed portion formed therein for receiving a lower end portion of said bearing portion.

11. The rotary head drum device according to claim 10, wherein said aperture is located in said recessed portion of said drum base.

12. The rotary head drum device according to claim 11, wherein said recessed portion in said drum base forms an elastically deformable, thin-walled portion in said drum base whereat said single screw passes through said aperture.

* * * * *